(12) United States Patent
Schildt et al.

(10) Patent No.: US 9,547,490 B1
(45) Date of Patent: Jan. 17, 2017

(54) SORTING RUNTIME CALLS OF DESIGN TIME ARTIFACTS VIA DATA DEPENDENCIES

(71) Applicant: SAP SE, Walldorf (DE)

(72) Inventors: Christopher Schildt, Walldorf (DE); Cornelia Kinder, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/946,707

(22) Filed: Nov. 19, 2015

(51) Int. Cl.
  *G06F 9/44* (2006.01)
  *G06F 17/30* (2006.01)
(52) U.S. Cl.
  CPC ........... *G06F 8/71* (2013.01); *G06F 17/30598* (2013.01)
(58) Field of Classification Search
  None
  See application file for complete search history.

(56) References Cited

U.S. PATENT DOCUMENTS 6,694,482 B1 * 2/2004 Arellano ........... G06F 17/30017
707/E17.009

* cited by examiner

*Primary Examiner* — Chuck Kendall
(74) *Attorney, Agent, or Firm* — Mintz Levin Cohn Ferris Glovsky and Popeo, P.C.

(57) ABSTRACT

Design time artifacts ordered in a dependency tree according to a call order defined by a database application accessing data in a database can be classified as source and/or sink artifacts. The dependency tree can be traversed in a direction reverse of the call order to determine, for each sink artifact, one or more required source artifacts upon which the sink artifact depends and that is needed to provide correct data inputs for operation of the sink artifact. Based on the traversing, implicitly dependent sink artifacts positioned earlier in the call order that their required source artifacts can be identified, and a new call order can be defined in which all of the required source artifacts for the implicitly dependent sink artifact are called before the implicitly dependent sink artifact.

18 Claims, 6 Drawing Sheets

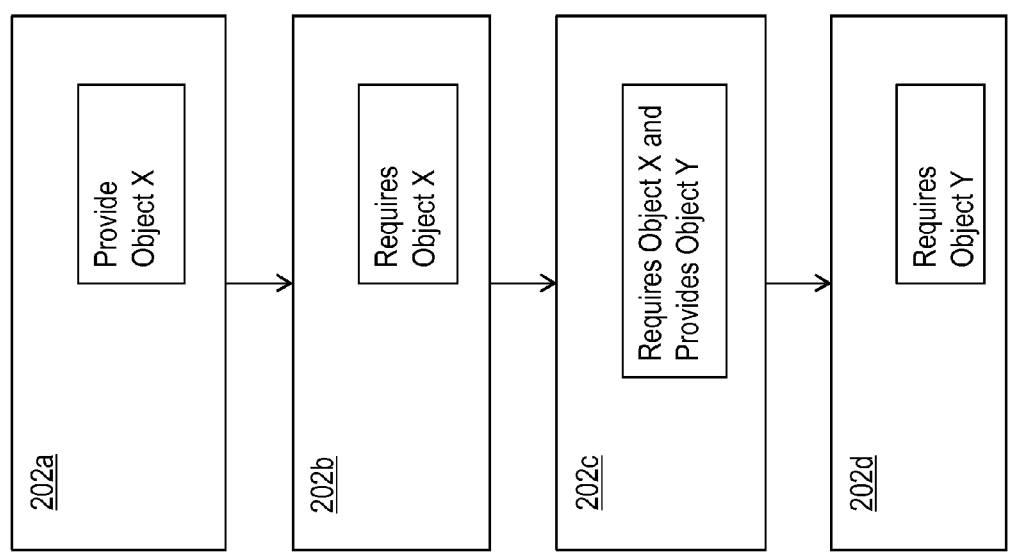
FIG. 2

```
FOR data_source IN all_artifacts_registered_as_source
    FOR target_description IN source_targets_of(X) target := get_provider_of(target_description) #going backward
        FOR provided_dep IN provides_of(target)
            FOR requirer in get_all_nodes_which_require (provided_dep) #going forward
                IF NOT requirer IS A DATA_SINK:
                    CONTINUE
                FI
                IF requirer EQUALS data_source
                    CONTINUE
                FI
                create_dependency(requirer, data_source)
            END
        END
    END
END
```

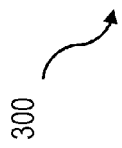

*FIG. 3*

SORTING RUNTIME CALLS OF DESIGN TIME ARTIFACTS VIA DATA DEPENDENCIES

TECHNICAL FIELD

The subject matter described herein relates to ordering of calls to design time artifacts based on their data dependencies and with respect to the flow of data.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

The design time artifacts used at the various levels of a database architecture (e.g. the tables in a physical layer; various joins, views, or other aggregations implemented in one or more logical layers; semantic objects in a semantic layer such as a calculation engine or the like; and application objects in an application layer) can include a variety of dependencies (e.g. an artifact can have one or more dependencies on other objects and can also be have other objects with dependencies on them. Not all dependencies between artifacts can be perceived simply by inspecting structural dependencies. For example, a statement in SQL (structured query language) or another special-purpose programming language for managing data of a DBMS can be used to generate a view or other data aggregation at the logical or physical table level of the database. Such statements are typically generated without knowledge of dependencies that may arise from other SQL statements or from actions occurring due to programming at other database levels. Without this knowledge, it is possible for design time artifacts of the database environment to be called in an order that leads to errors.

SUMMARY

Aspects of the current subject matter can include ordering calls of design time artifacts based on their data dependencies and with respect to the flow of data to ensure that these calls are executed in a correct sequence that does not break any of the existing dependencies.

In one aspect, a method includes classifying each design time artifact of a plurality of design time artifacts in a dependency tree as at least one of a source artifact and a sink artifact. The dependency tree includes the plurality of design time artifacts ordered according to a call order defined by a database application accessing data in a database. The method further includes traversing the dependency tree in a direction reverse of the call order to determine, for each sink artifact, one or more required source artifacts upon which the sink artifact depends and that is needed to provide correct data inputs for operation of the sink artifact. Based on the traversing, an implicitly dependent sink artifact of the plurality of design time artifacts that is positioned earlier in the call order than at least one of the one or more required source artifacts for the implicitly dependent sink artifact is identified, and a new call order of the plurality of design time artifacts is defined in which all of the one or more required source artifacts for the implicitly dependent sink artifact are called before the implicitly dependent sink artifact.

In optional variations, one or more of the following features can be included in any feasible combination. The at least one of the one or more required source artifacts for the implicitly dependent sink artifact can include a design time table import object that imports data necessary for proper operation of the database application into a database table provided by another of the plurality of design time artifacts. The correct data inputs for operation of the sink artifact can be necessary for accurate presentation of data by the database application. The implicitly dependent sink artifact can have both a structural dependency on at least one design time artifact of the plurality of design time artifacts and an implicit dependency on another design time artifact of the plurality of design time artifacts. Each sink artifact can have a dependency on one of the source artifacts and each source artifact can have at least one sink artifact that has a dependency from that source artifact. The method can further include constructing the dependency tree based on the call order and/or calling the plurality of design time artifacts based on the new call order.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 shows a diagram illustrating an ordering of design time artifacts based on required dependencies;

FIG. 3 shows an example of pseudocode relating to implementations of the current subject matter;

When practical, similar reference numbers denote similar structures, features, or elements.

DETAILED DESCRIPTION

The current subject matter relates to ordering the calling of design time artifacts (e.g. objects, views, sequences, etc. in a DBMS environment) based on their dependencies and with respect to the flow of data to ensure that calls to a plurality of design time artifacts at run time occurs in a proper or correct order to avoid, for example, inclusion of data that have not been correctly loaded into an underlying logical or database object into a higher level representation of these data. A correct ordering of a plurality of objects can be determined, such as by using data dependent behavior of the objects.

A simplified example of a situation that may be addressed by existing approaches includes direct and explicit structural dependencies. For example, operations for producing a sequence can include defining or identifying a table (e.g. a database object in a physical layer of the database), generating a view (e.g. a tailored presentation of data contained in one or more tables or other views) on top of the table via one or more SQL statements, and producing the sequence (e.g. an ordered list of values generated via one or more SQL statements or by a call from a higher level programming language in an application layer, via a semantic call from a calculation engine layer, or the like) that makes use of the view. In this example, the sequence requires the view for proper execution and the view requires the table, and these structural dependencies are clear from the definition of each operation.

In contrast to the above example, some dependencies between design time artifacts called at run time cannot be determined by only evaluating structural dependencies. As such, an additional property of the design time artifacts can be determined and implemented to describe these design time artifacts, such as with regards to their implicit data dependencies, as will be discussed in greater detail below.

Figure 1:
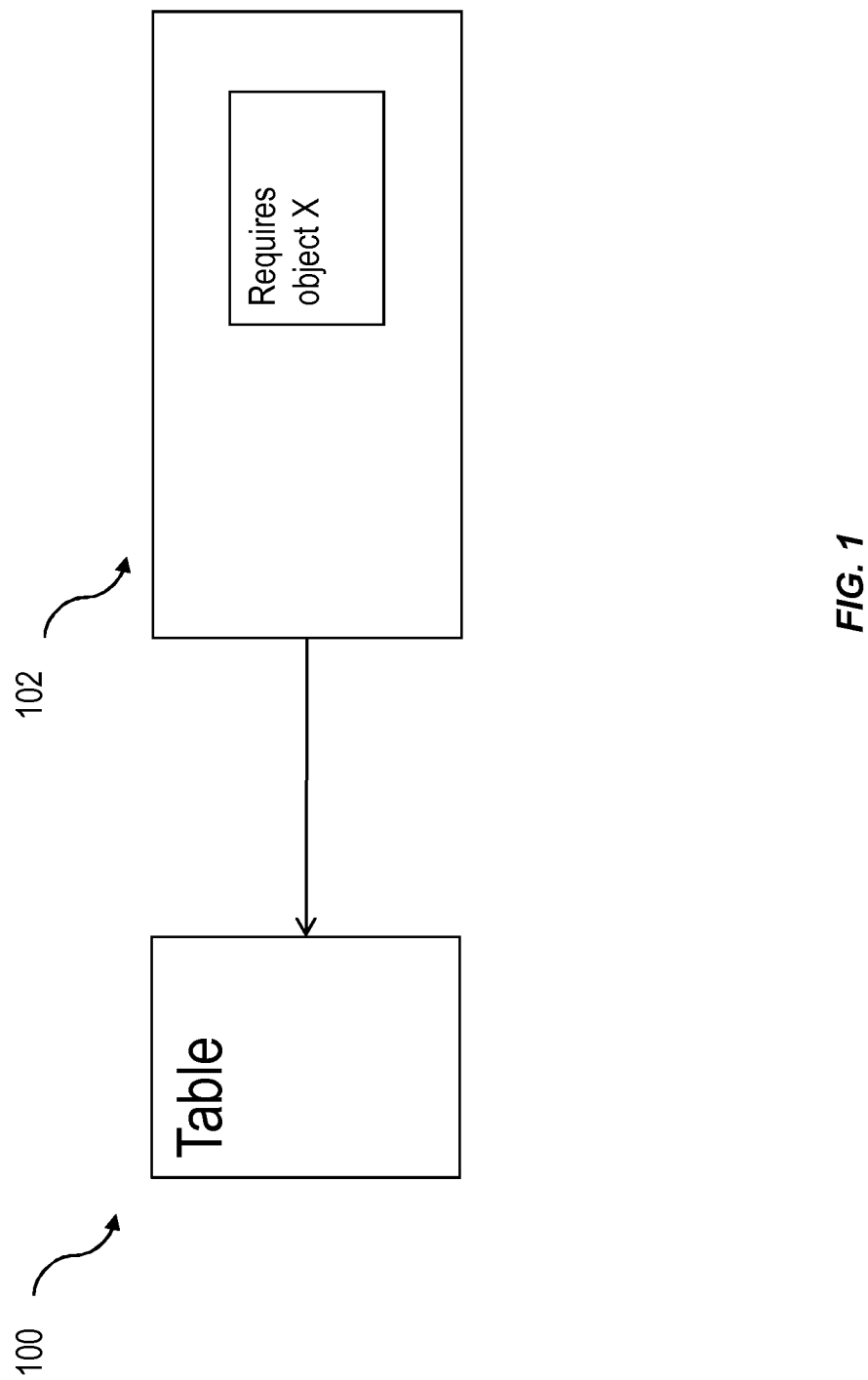
FIG. 1 shows a diagram illustrating a table and a first design time artifact including a dependency.

FIG. 1 shows a diagram illustrating a table 100 and a first design time artifact 102 that imports data into the table 100. In this example, the design time artifact 102 is a data sink since it requires the presence of an object (i.e. the table 100, also referred to as object X) to perform its operations (i.e. populating the table 100). In contrast, a data source can provide an object, such as object X. Therefore, if a design time artifact is executed and it is a data sink, the required data or object must be available, such as by having been previously provided by a data source. As such, it is important for design time artifacts to be executed in a sequence that allows data sinks to have their necessary data sources already executed and/or available for use by the data sink.

FIG. 2 shows a diagram illustrating an ordering of design time artifacts, i.e., a dependency tree 200, based on required dependencies of the design time artifacts 202a-202d. As shown in FIG. 2, a first design time artifact 202a can include a data source that provides object X, as defined in the dependency of the first design time artifact 202a. A second design time artifact 202b can be a data sink that requires object X, as defined in the dependency of the second design time artifact 202b. A third design time artifact 202c can be a data sink and data source that requires object X and provides object Y, as defined in the dependency of the third design time artifact 202c. In addition, a fourth design time artifact 202d can be a data sink that requires object Y, as also defined in the dependency of the fourth design time artifact 202d. These four design time artifacts 202a-202d can be sorted for determining an appropriate sequence of execution of the design time artifacts 202a-202d.

A more concrete example of a situation such as that depicted in FIG. 2 is as follows: the first design time artifact 202a can designate (e.g. provide) a Table X (e.g. as a source), while the second design time artifact 202b can be a design time table import (DTTI) object that imports (e.g. provide, as a source) data into Table X (the first design time artifact 202a) and that therefore requires Table X (as a sink). The third design time artifact 202c can be a view Y on the Table X, which can therefore provide the view Y (as a source) and require the Table X (as a sink). The fourth design time artifact 202d can be a sequence that references the view Y in a reset query and that therefore requires the view Y (the fourth design time artifact 202d) and is a sink. When the four design time artifacts shown in FIG. 2 are called in the order shown, the view Y accesses the table X after the DTTI object (the second design time artifact 202b) has imported data to the Table X. The sequence (the fourth design time artifact 202d) therefore accesses the view Y, which has in turn accessed the Table X after the proper data have been imported.

The view Y has a direct structural dependency on the Table X. In other words, if the Table X is not present when the view Y occurs in a call order, a logical error will occur, thereby stopping execution. However, the view Y has only an implicit dependency on the DDTI object (the second design time artifact 202b in FIG. 2). If the DTTI object is not called before the view Y, but the table X has already been provided by the first design time artifact 202a, the call order will proceed without error, but the view Y will be populated without the data import to Table X specified in the DDI object. Accordingly, a user viewing the sequence would be presented with inaccurate data. Thus, the view Y in this example is an implicitly dependent sink artifact with regard to the DTTI object (the second design time artifact 202b). Absent an approach such as that provided by implementations of the current subject matter, the view Y (the third design time artifact 202c) could be called prior to the DDTI object (the second design time artifact 202b). An approach that my be used to identify and remedy such issues can include one or more of the features described below.

A dependency tree, such as the dependency tree 200 shown in FIG. 2, can be constructed where data dependencies are assigned to the artifacts 202a-202d. The needed dependencies, and thus the order of execution of the artifacts 202a-202d, can be determined by switching the direction in which the dependency tree is traversed. For example, the fourth design time artifact 202d can be evaluated first, thereby determining that the fourth design time artifact 202d is a data sink that requires data or an object (e.g., requires object Y) from another design time artifact, such as design time artifact 202c (e.g., which provides object Y).

By traversing the dependency tree in reverse order, all data sinks that are dependent from a target source can be determined. This can lead to determined dependencies that can be used to determine an ordering of the design time artifact 202a-202d, where the ordering defines a sequence of execution of the design time artifacts. As such, execution of the design time artifacts can be based on the determined sequence of execution, thereby providing valid execution of all of the design time artifact 202a-202d, such as the ones constructed in the dependency tree 200. In addition, in at least some implementations, either such constructing or ordering can be done in a calculation engine of a database system.

FIG. 3. shows an example of pseudocode 300 describing operations that can be performed consistent with implementations of the current subject matter.

Figure 4:
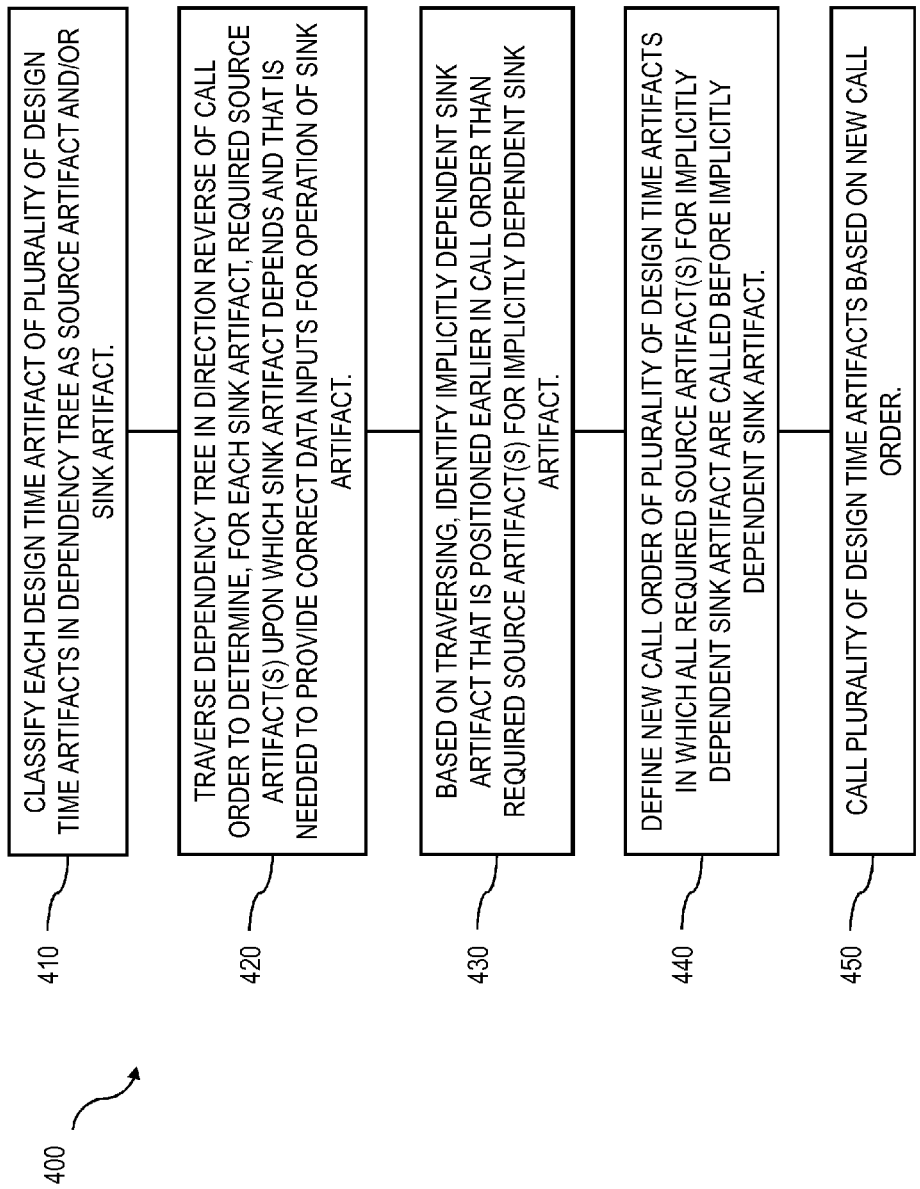
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. It will be understood that other implementations may include or exclude certain features. At 410, each design time artifact of a plurality of design time artifacts in a dependency tree is classified as either or both of source artifact and a sink artifact. For example, a given design time artifact can be a source artifact, a sink artifact, or both. The dependency tree includes the plurality of design time artifacts ordered according to a call order defined by a database application accessing data in a database. Each sink artifact has a dependency on one of the source artifacts and each source artifact has at least one sink artifact that has a dependency from that source artifact.

At 420, the dependency tree is traversed in a direction reverse of the call order. This reverse direction traversal allows a determination for each sink artifact of one or more required source artifacts upon which the sink artifact depends. The one or more required source artifacts is/are needed to provide correct data inputs for operation of the sink artifact, for example to ensure that correct data are presented in the database application. As noted above, certain source objects can be implicitly required by certain sink objects. A sink object that implicitly requires a source object can be referred to as an implicitly dependent sink object. A non-limiting example of an implicitly dependent sink object is one that requires provision of both a data structure and an action to place that data structure in a current or updated state. The case illustrated in FIG. 2 and described above is illustrative of one possible example of such an implicit dependency. For example, while the third design time artifact 202c (view Y) structurally requires the first design time artifact 202a (Table X), the third design time artifact 202c is only implicitly dependent on the second design time artifact 202b (the DTTI object) because the second design time artifact 202b is needed only to provide the correct data upon which the view Y should be based.

At 430, an implicitly dependent sink artifact of the plurality of design time artifacts that is positioned earlier in the call order than at least one of the one or more required source artifacts for the implicitly dependent sink artifact is identified based on the reverse direction traversal, and at 440, a new call order of the plurality of design time artifacts is defined in which all of the one or more required source artifacts for the implicitly dependent sink artifact are called before the implicitly dependent sink artifact. Subsequent to the defining of the new call order, the plurality of design time artifacts can be called at 650 based on the new call order.

Figure 5:
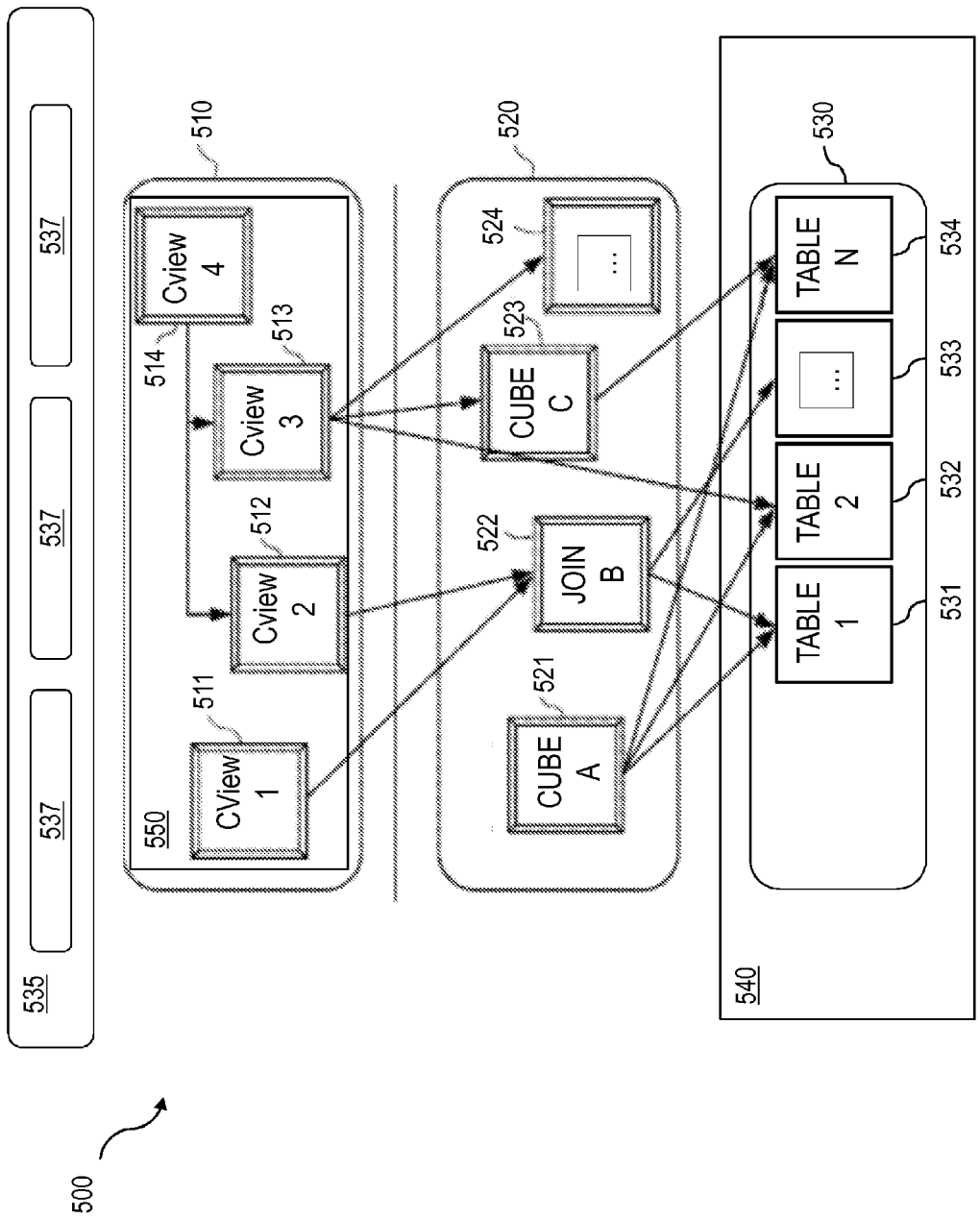
FIG. 5 shows a diagram illustrating a computing architecture consistent with implementations of the current subject matter including a database system that includes three layers: a calculation engine layer, a logical layer, and a physical table-pool.

FIG. 5 is a diagram that illustrates a computing architecture 500 including a database system that includes three layers: a calculation engine layer 510, a logical layer 520, and a physical table-pool 530. One or more application servers 535 implementing database client applications 537 can access the database system 600. Calculation scenarios can be executed by a calculation engine, which can form part of a database or which can be part of the calculation engine layer 510 (which is associated with the database). The calculation engine layer 510 can be based on and/or interact with the other two layers, the logical layer 520 and the physical table pool 530. The basis of the physical table pool 530 consists of physical tables (called indexes) containing the data, which can be stored on one more database servers 540. Various tables 531-334 can be joined using logical metamodels 521-324 defined by the logical layer 520 to form an index. For example, the tables 531-334 in a cube (e.g. an online analytical processing or "OLAP" index) can be assigned roles (e.g., fact or dimension tables) and joined to form a star schema. It is also possible to form join indexes (e.g. join index B 522 in FIG. 5), which can act like database views in computing environments such as the Fast Search Infrastructure (FSI) available from SAP SE of Walldorf, Germany.

As stated above, a calculation scenario 550 can include individual nodes (e.g. calculation nodes) 511-314, which in turn each define operations such as joining various physical or logical indexes and other calculation nodes (e.g., CView 6 is a join of CView 2 and CView 5). That is, the input for a node 511-314 can be one or more physical, join, or OLAP indexes or calculation nodes.

In a calculation scenario 550, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 550 can be created which can be reused by multiple queries even if such queries do not require every attribute specified by the calculation scenario 550.

Every calculation scenario 550 can be uniquely identifiable by a name (e.g., the calculation scenario 550 can be a database object with a unique identifier, etc.). Accordingly, the calculation scenario 550 can be queried in a manner similar to a view in a SQL database. Thus, the query is forwarded to the calculation node 511-314 for the calculation scenario 550 that is marked as the corresponding default node. In addition, a query can be executed on a particular calculation node 511-314 (as specified in the query). Furthermore, nested calculation scenarios can be generated in which one calculation scenario 550 is used as source in another calculation scenario (e.g. via a calculation node 511-314 in this calculation scenario 550). Each calculation node 511-314 can have one or more output tables. One output table can be consumed by several calculation nodes 511-314.

Figure 6:
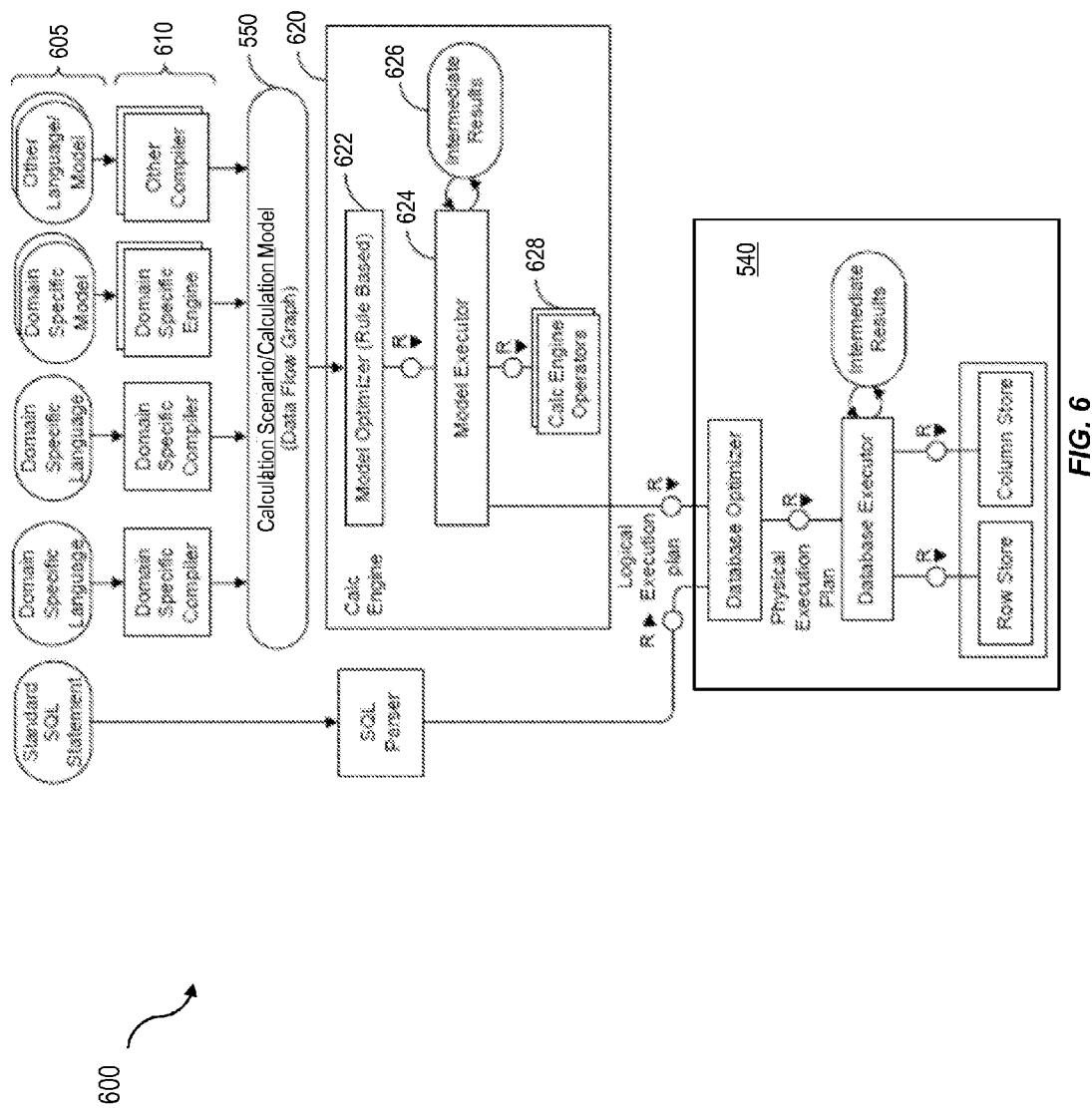
FIG. 6 shows a diagram illustrating a sample architecture for request processing and execution control consistent with implementations of the current subject matter.

FIG. 6 is a diagram 600 illustrating a sample architecture for request processing and execution control. As shown in FIG. 6, artifacts 605 in different domain specific languages can be translated by their specific compilers 610 into a common representation called a "calculation scenario" 550 (which is also referred to in FIG. 6 as a calculation model). To achieve enhanced performance, the models and programs written in these languages are executed inside the database server 540. This arrangement eliminates the need to transfer large amounts of data between the database server 540 and a client application 537, which can be executed by an application server 535. Once the different artifacts 605 are compiled into this calculation scenario 615, they can be processed and executed in the same manner. A calculation engine 620 executes the calculation scenarios 615.

A calculation scenario 615 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 537 at the application server 535). Inputs can be connected to tables or to the outputs of other nodes. A calculation scenario 615 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 615 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 615 can be defined as part of database metadata and invoked multiple times. A calculation scenario 615 can be created, for example, by a SQL statement "CREATE CALCULATION SCENARIO <NAME> USING <XML or JSON>". Once a calculation scenario 615 is created, it can be queried (e.g., "SELECT A, B, C FROM <scenario name>", etc.). In some cases, databases can have pre-defined calculation scenarios 615 (default, previously defined by users, etc.). Calculation scenarios 615 can be persisted in a repository (coupled to the database server 540) or in transient scenarios. Calculation scenarios 615 can also be kept in-memory.

Calculation scenarios 615 are more powerful than traditional SQL queries or SQL views for many reasons. One reason is the possibility to define parameterized calculation schemas that are specialized when the actual query is issued. Unlike a SQL view, a calculation scenario 615 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 615 may contain an aggregation node containing all attributes. Later, the attributes for grouping can be supplied with the query. This allows having a predefined generic aggregation, with the actual aggregation dimensions supplied at invocation time. The calculation engine 620 can use the actual parameters, attribute list, grouping attributes, and the like supplied with the invocation to instantiate a query specific calculation scenario 615. This instantiated calculation scenario 615 is optimized for the actual query and does not contain attributes, nodes or data flows that are not needed for the specific invocation.

When the calculation engine 620 gets a request to execute a calculation scenario 615, it can first optimize the calculation scenario 615 using a rule based model optimizer 622. Examples for optimizations performed by the model optimizer can include "pushing down" filters and projections so that intermediate results 626 are narrowed down earlier, or the combination of multiple aggregation and join operations into one node. The optimized model can then be executed by a calculation engine model executor 624 (a similar or the same model executor can be used by the database directly in some cases). This includes decisions about parallel execution of operations in the calculation scenario 615. The model executor 624 can invoke the required operators (using, for example, a calculation engine operators module 628) and manage intermediate results. Most of the operators are executed directly in the calculation engine 620 (e.g., creating the union of several intermediate results). The remaining nodes of the calculation scenario 615 (not implemented in the calculation engine 620) can be transformed by the model executor 624 into a set of logical database execution plans. Multiple set operation nodes can be combined into one logical database execution plan if possible.

The calculation scenarios 615 of the calculation engine 620 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 620 to execute the calculation scenario 615 behind the calculation view. In some implementations, the calculation engine 620 and the SQL processor are calling each other: on one hand the calculation engine 620 invokes the SQL processor for executing set operations and SQL nodes and, on the other hand, the SQL processor invokes the calculation engine 620 when executing SQL queries with calculation views.

The attributes of the incoming datasets utilized by the rules of model optimizer 622 can additionally or alternatively be based on an estimated and/or actual amount of memory consumed by the dataset, a number of rows and/or columns in the dataset, and the number of cell values for the dataset, and the like.

A calculation scenario 615 as described herein can include a type of node referred to herein as a semantic node (or sometimes semantic root node). A database modeler can flag the root node (output) in a graphical calculation view to which the queries of the database applications directed as semantic node. This arrangement allows the calculation engine 620 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory computer-readable storage medium storing instructions that, when executed by at least one programmable processor, cause the at least one programmable processor to perform operations comprising:
    classifying each design time artifact of a plurality of design time artifacts in a dependency tree as at least one of a source artifact and a sink artifact, the dependency tree comprising the plurality of design time artifacts ordered according to a call order defined by a database application accessing data in a database;
    traversing the dependency tree in a direction reverse of the call order to determine, for each sink artifact, one or more required source artifacts upon which the sink artifact depends and that is needed to provide correct data inputs for operation of the sink artifact;
    identifying, based on the traversing, an implicitly dependent sink artifact of the plurality of design time artifacts that is positioned earlier in the call order than at least one of the one or more required source artifacts for the implicitly dependent sink artifact; and
    defining a new call order of the plurality of design time artifacts in which all of the one or more required source artifacts for the implicitly dependent sink artifact are called before the implicitly dependent sink artifact.

2. The computer program product of claim 1, wherein the at least one of the one or more required source artifacts for the implicitly dependent sink artifact comprises a design time table import object that imports data necessary for proper operation of the database application into a database table provided by another of the plurality of design time artifacts.

3. The computer program product of claim 1, wherein the correct data inputs for operation of the sink artifact are necessary for accurate presentation of data by the database application.

4. The computer program product of claim 1, wherein the implicitly dependent sink artifact has both a structural dependency on at least one design time artifact of the plurality of design time artifacts and an implicit dependency on another design time artifact of the plurality of design time artifacts.

5. The computer program product of claim 1, wherein the operations further comprise constructing the dependency tree based on the call order.

6. The computer program product of claim 1, wherein the operations further comprise calling the plurality of design time artifacts based on the new call order.

7. A method for implementation by one or more data processors forming part of at least one computing system, the method comprising:

classifying each design time artifact of a plurality of design time artifacts in a dependency tree as at least one of a source artifact and a sink artifact, the dependency tree comprising the plurality of design time artifacts ordered according to a call order defined by a database application accessing data in a database;

traversing the dependency tree in a direction reverse of the call order to determine, for each sink artifact, one or more required source artifacts upon which the sink artifact depends and that is needed to provide correct data inputs for operation of the sink artifact;

identifying, based on the traversing, an implicitly dependent sink artifact of the plurality of design time artifacts that is positioned earlier in the call order than at least one of the one or more required source artifacts for the implicitly dependent sink artifact; and defining a new call order of the plurality of design time artifacts in which all of the one or more required source artifacts for the implicitly dependent sink artifact are called before the implicitly dependent sink artifact.

8. The method of claim 7, wherein the at least one of the one or more required source artifacts for the implicitly dependent sink artifact comprises a design time table import object that imports data necessary for proper operation of the database application into a database table provided by another of the plurality of design time artifacts.

9. The method of claim 7, wherein the correct data inputs for operation of the sink artifact are necessary for accurate presentation of data by the database application.

10. The method of claim 7, wherein the implicitly dependent sink artifact has both a structural dependency on at least one design time artifact of the plurality of design time artifacts and an implicit dependency on another design time artifact of the plurality of design time artifacts.

11. The method of claim 7, further comprising constructing the dependency tree based on the call order.

12. The method of claim 7, further comprising calling the plurality of design time artifacts based on the new call order.

13. A system comprising:
computer hardware comprising at least one programmable processor configured to perform operations comprising:
classifying each design time artifact of a plurality of design time artifacts in a dependency tree as at least one of a source artifact and a sink artifact, the dependency tree comprising the plurality of design time artifacts ordered according to a call order defined by a database application accessing data in a database;

traversing the dependency tree in a direction reverse of the call order to determine, for each sink artifact, one or more required source artifacts upon which the sink artifact depends and that is needed to provide correct data inputs for operation of the sink artifact;

identifying, based on the traversing, an implicitly dependent sink artifact of the plurality of design time artifacts that is positioned earlier in the call order than at least one of the one or more required source artifacts for the implicitly dependent sink artifact; and defining a new call order of the plurality of design time artifacts in which all of the one or more required source artifacts for the implicitly dependent sink artifact are called before the implicitly dependent sink artifact.

14. The system of claim 13, wherein the at least one of the one or more required source artifacts for the implicitly dependent sink artifact comprises a design time table import object that imports data necessary for proper operation of the database application into a database table provided by another of the plurality of design time artifacts.

15. The system of claim 13, wherein the correct data inputs for operation of the sink artifact are necessary for accurate presentation of data by the database application.

16. The system of claim 13, wherein the implicitly dependent sink artifact has both a structural dependency on at least one design time artifact of the plurality of design time artifacts and an implicit dependency on another design time artifact of the plurality of design time artifacts.

17. The system of claim 13, wherein the operations further comprise constructing the dependency tree based on the call order.

18. The system of claim 13, wherein the operations further comprise calling the plurality of design time artifacts based on the new call order.

* * * * *